US011654938B1

(12) United States Patent
Kumar et al.

(10) Patent No.: US 11,654,938 B1
(45) Date of Patent: May 23, 2023

(54) METHODS AND APPARATUS FOR DISENGAGING AN AUTONOMOUS MODE BASED ON LATERAL ERROR OF AN AUTONOMOUS VEHICLE

(71) Applicant: PlusAI, Inc., Cupertino, CA (US)

(72) Inventors: Amit Kumar, Sunnyvale, CA (US); Siva Bhargav Ravella, Santa Clara, CA (US); Anurag Ganguli, Saratoga, CA (US); Lichun Yang, Cupertino, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/669,900

(22) Filed: Feb. 11, 2022

(51) Int. Cl.
*B60W 60/00* (2020.01)
(52) U.S. Cl.
CPC ..... *B60W 60/0053* (2020.02); *B60W 2420/24* (2013.01); *B60W 2420/42* (2013.01); *B60W 2420/52* (2013.01); *B60W 2422/00* (2013.01); *B60W 2510/20* (2013.01); *B60W 2530/20* (2013.01); *B60W 2540/18* (2013.01); *B60W 2552/05* (2020.02)
(58) Field of Classification Search
CPC ........ B60W 60/0053; B60W 2420/24; B60W 2420/42; B60W 2420/52; B60W 2422/00; B60W 2510/20; B60W 2530/20; B60W 2540/18; B60W 2552/05; B60W 2552/53; B60W 2554/801; B60W 2710/202; B60W 30/12; B60W 30/165; B62D 15/025; B62D 5/0463; B62D 6/00; B62D 6/04
See application file for complete search history.

(56) References Cited

U.S. PATENT DOCUMENTS

| | | | |
|---|---|---|---|
| 9,227,632 B1* | 1/2016 | Lee | B60W 30/0956 |
| 11,042,155 B2 | 6/2021 | Zheng et al. | |
| 11,130,497 B2 | 9/2021 | Zhou et al. | |
| 11,273,836 B2 | 3/2022 | Zheng et al. | |
| 2017/0349186 A1* | 12/2017 | Miller | B60W 40/08 |
| 2018/0297605 A1* | 10/2018 | Kasaiezadeh Mahabadi | B60W 40/10 |
| 2018/0297640 A1* | 10/2018 | Fujii | B62D 6/04 |
| 2019/0088148 A1* | 3/2019 | Jacobus | G08G 1/096716 |
| 2019/0092336 A1* | 3/2019 | Czarnecki | B60W 10/184 |
| 2019/0135279 A1* | 5/2019 | Irie | B60W 30/16 |
| 2019/0185010 A1 | 6/2019 | Ganguli et al. | |
| 2019/0185011 A1 | 6/2019 | Zheng et al. | |
| 2019/0185012 A1 | 6/2019 | Zheng et al. | |
| 2019/0359202 A1* | 11/2019 | Zhu | G05D 1/0242 |
| 2020/0047752 A1* | 2/2020 | Ivanovic | B60W 30/12 |
| 2020/0064839 A1* | 2/2020 | Oyama | G05D 1/0088 |
| 2020/0192359 A1* | 6/2020 | Aragon | G05D 1/0221 |
| 2020/0307691 A1* | 10/2020 | Kalabic | B62D 15/025 |

(Continued)

*Primary Examiner* — Babar Sarwar
(74) *Attorney, Agent, or Firm* — Sheppard Mullin Richter & Hampton LLP

(57) ABSTRACT

In one or more embodiments, a method comprises receiving, at a processor, sensor data from a sensor at a vehicle that is moving while in an autonomous mode. A position and an orientation of the vehicle based on the sensor data is determined at the processor. A lateral deviation of the vehicle from a planned path based on the position and the orientation of the vehicle while the vehicle is moving in the autonomous mode is calculated at the processor. In response to the lateral deviation exceeding a predefined lateral deviation threshold, the autonomous mode is disengaged.

20 Claims, 4 Drawing Sheets

(56) References Cited

U.S. PATENT DOCUMENTS

2021/0291855 A1\* 9/2021 Wang .............. B60W 30/18054
2021/0331734 A1\* 10/2021 Kim ....................... B62D 1/286
2021/0354748 A1\* 11/2021 Kunihiro .............. B62D 5/0463

\* cited by examiner

METHODS AND APPARATUS FOR DISENGAGING AN AUTONOMOUS MODE BASED ON LATERAL ERROR OF AN AUTONOMOUS VEHICLE

FIELD OF THE DISCLOSURE

The present disclosure relates to autonomous vehicle control, and more specifically, autonomous vehicle control to disengage an autonomous mode in an autonomous vehicle based on lateral error during operation of the autonomous vehicle.

BACKGROUND

A driver assistant system on an autonomous vehicle supports drivers during driving and parking. In some scenarios, a driver needs or intends to regain control over the driver assistant system during autonomous mode. Currently, known methods to disengage autonomous mode in an autonomous vehicle are: (a) disengage by applying a torque on the steering wheel, (b) disengage by measuring the capacitance on the steering wheel (touching the steering wheel causes a change in capacitance), (c) disengage by pressing the gas/throttle pedal, and (d) disengage by pressing the brake pedal.

In some scenarios, the driver applies a torque on the steering wheel with an intent to disengage the autonomous mode, but the driver assistant system does not disengage the autonomous mode because the input torque is less than a predefined torque threshold (e.g., an amount of predefined torque to communicate an intent to disengage the autonomous mode). Often, this creates cognitive problems for drivers and cause high risks during driving and parking. Therefore, a need exists to help a driver to disengage the autonomous mode effectively.

SUMMARY

In one or more embodiments, a method comprises receiving, at a processor, sensor data from a sensor at a vehicle that is moving while in an autonomous mode. A position and an orientation of the vehicle based on the sensor data is determined at the processor. A lateral deviation of the vehicle from a planned path based on the position and the orientation of the vehicle while the vehicle is moving in the autonomous mode is calculated at the processor. In response to the lateral deviation exceeding a predefined lateral deviation threshold, the autonomous mode is disengaged.

In one or more embodiments, a method comprises receiving, at a processor, a signal indicating a torque applied, by a driver of a vehicle, on a steering wheel of the vehicle that is moving in an autonomous mode. A lateral deviation of the vehicle from a planned path based on a position and an orientation of the vehicle that is moving in the autonomous mode is calculated at the processor. In response to the torque being below a torque threshold and in response to the lateral deviation exceeding a predefined lateral deviation threshold, the autonomous mode of the vehicle is disengaged.

In one or more embodiments, an apparatus comprises a processor and a memory operatively coupled to the processor. The memory stores instructions that when executed cause the processor to: receive sensor data from a sensor at a vehicle that is moving while in an autonomous mode. The memory also stores instructions to cause the processor to determine, based on the sensor data, a position and an orientation of the vehicle that is moving while in the autonomous mode. The memory also stores instructions to cause the processor to calculate, while the vehicle is moving in the autonomous mode, a lateral deviation of the vehicle from a planned path based on the position and the orientation of the vehicle. The memory also stores instructions to cause the processor to receive a signal indicating a torque applied by a driver of the vehicle on a steering wheel while the vehicle is moving in the autonomous mode. In response to the torque being below a torque threshold and in response to the lateral deviation exceeding a predefined lateral deviation threshold, the autonomous mode of the vehicle is disengaged.

DETAILED DESCRIPTION

A driver assistant system on an autonomous vehicle supports drivers during driving and parking. Sometimes, a driver needs or intends to regain control over the driver assistant system during autonomous mode. In some scenarios, driver applies a torque on the steering wheel with an intent to disengage autonomous mode, but the driver assistant system does not disengage the autonomous mode because the input torque is less than the predefined torque threshold. Thus, this creates cognitive problems for drivers and cause high risks during driving and parking.

With the increasing prevalence of self-driving vehicles, systems and methods to help driver disengage autonomous mode are desirable. One or more embodiments described herein can solve the above-discussed problems by introducing an additional method for disengaging autonomous mode based on lateral error of the autonomous vehicle. An autonomous vehicle receives sensor data and calculates a lateral deviation of the autonomous vehicle relative to a planned path. When the lateral deviation exceeds a predefined lateral deviation threshold, the autonomous mode is disengaged. Moreover, systems and methods described herein, according to some embodiments, can be especially useful during unexpected events, such as when: (a) a driver applies a torque on the steering wheel with an intent to disengage autonomous mode but the torque is less than a predefined torque threshold, (b) electric power steering (EPS) loses power and is not able to output enough torque to control the vehicle optimally, (c) a tire blows out, etc.

Figure 1:
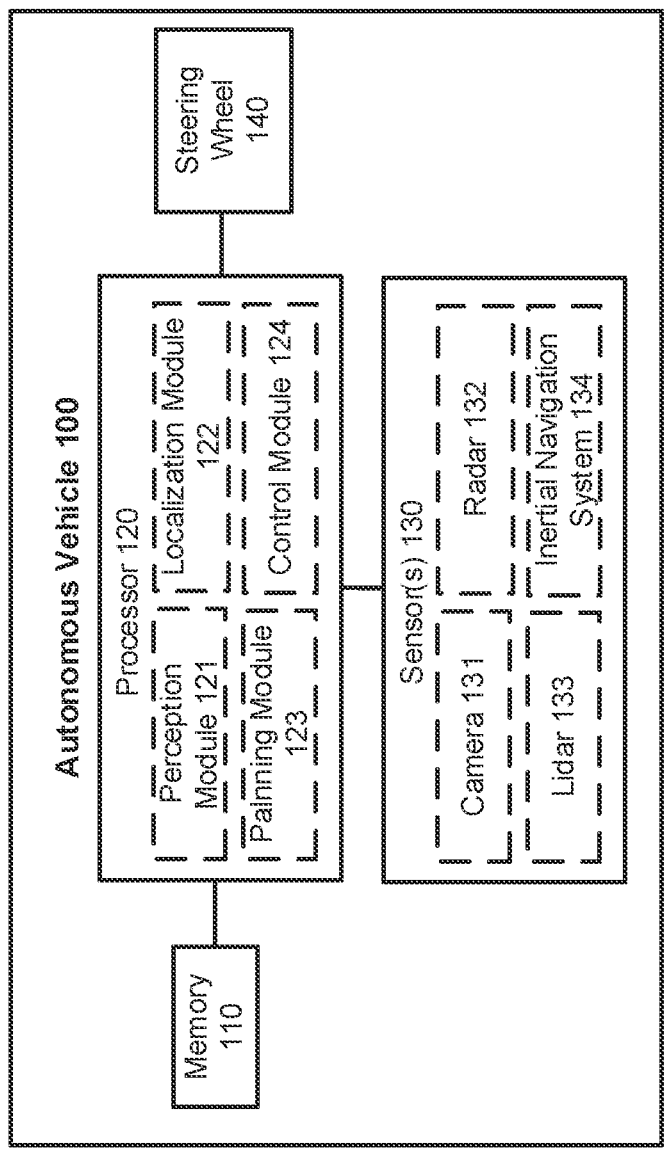
FIG. 1 shows a block diagram of an autonomous vehicle that can disengage autonomous mode based on lateral error, according to an embodiment.

FIG. 1 shows a block diagram for an autonomous vehicle 100, according to one embodiment. The autonomous vehicle 100 can be any type of vehicle, such as a car, bus, or semitruck. The autonomous vehicle 100 includes a processor 120, memory 110 operatively coupled to the processor 120, sensor(s) 130 operatively coupled to the processor 120, and a steering wheel 140 operatively coupled to the processor 120. The steering wheel 140 is communicatively coupled to the processor 120 through communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects electronic control units (ECU) within the vehicle and exchanges information between different ECUs. The ECU having the processor 120 can receive data representing the steering wheel data from the communication network. In some implementations, the ECU having the processor 120 can be separate and distinct from every other ECU(s) in the autonomous vehicle 100 and operatively coupled to the communication backbone network. In other implementations, the ECU having the processor 120 can be part of an existing ECU(s) that is programmed to have the functions discussed in this disclosure and operatively coupled to the communication backbone network.

The processor 120 includes one or more modules: a perception module 121, a localization module 122, a planning module 123, and a control module 124. The sensor(s) 130 includes one or more of: a camera 131, a radar 132, a lidar 133, and an inertial navigation system (INS) 134. The processor 120 can be configured to perform (or cause to be performed) any of the techniques discussed herein.

The processor 120 can be, for example, a hardware based integrated circuit (IC) or any other suitable processing device configured to run and/or execute a set of instructions or code. For example, the processor 114 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 114 can be configured to run any of the methods and/or portions of methods discussed herein.

As mentioned above, the processor 120 includes one or more modules: a perception module 121, a localization module 122, a planning module 123, and a control module 124. The perception module 121 is configured to receive sensor data from sensor(s) 130 and process the sensor data. For example, the perception module 121 can process data by performing sensor fusion for data received from various sensor(s) 130. The perception module 121 can also process the sensor data to detect and track static and/or dynamic objects while the autonomous vehicle 100 is moving in the autonomous mode. Examples of objects to be detected and tracked can include one or more of people, animals, cars, trucks, bikes, motorcycles, trees, signs, lane markings, cones, and/or rocks. Additional discussion related to object/feature detection are discussed in U.S. Pat. No. 11,042,155, the content of which is incorporated in its entirety herein. The perception module 121 outputs the processed data to the localization module 122 and the planning module 123.

The localization module 122 is configured to receive the processed data from the perception module 121 and determine a position and orientation of the autonomous vehicle 100. Additional information related to position and orientation determination is provided in each of US Patent Publication No. 2019/0185010, US Patent Publication No. 2019/0185011, US Patent Publication No. 2019/0185012, and U.S. Pat. No. 11,130,497, the contents of which are incorporated in their entireties herein. The localization module outputs the position and the orientation of the autonomous vehicle 100 to the planning module 123 and the control module 124.

The planning module 123 is configured to determine a planned path of the autonomous vehicle 100 based on the data received from the perception module 121 and the localization module 122. It is to be understood that the planned path can also be (or alternatively) provided by a processor remote to autonomous vehicle 100, or from a processor on the autonomous vehicle 100 (e.g., part of processor 120 or a different processor on the autonomous vehicle 100). In some implementations where a general route or trajectory is provided by a remote processor, planning module 123 can determine a detailed planned path such as which lane is the best. Alternatively, planning module 123 can determine both the general route/trajectory and the detailed planned path such as the specific lanes. In some implementations, the planned path includes a road surface having at least one of a missing lane boundary marking, a non-uniform lane width, or a parking lot, etc. Of course, other types of planned paths exist and the examples above are not meant to be exhaustive. Additional information related to path planning is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties. The planning module 123 outputs the planned path to the control module 124.

The control module 124 is configured to control a motion of the autonomous vehicle 100. The control module 124 receives the input planned path from the planning module 123 and the position and orientation information of the autonomous vehicle 100 from the localization module 122. The control module is configured to control the motion of the autonomous vehicle 100 to follow the planned path from the planning module 123 with minimal deviation. Deviation is calculated based on the difference between the planned path and the actual position and orientation of the autonomous vehicle 100. Minimal deviation or similar variation thereof can refer to, for example, a difference/discrepancy between two or more values that is within an acceptable range (e.g., less than a predetermined maximum, a percentage (e.g., 10%, 25%, 50%) within a predetermined acceptable value, etc.). The acceptable range can be set at a default value and/or tuned based on a particular use case (e.g., by a human, by a software model based on parameters associated with the particular use case). In some implementations, minimal deviation can refer to a distance between a planned path and an actual movement that is less than a predetermined value, such as 1 foot, 2 feet, etc. The control module 124 disengages the autonomous mode of the autonomous vehicle 100 when the lateral deviation of the autonomous vehicle 100 relative to the planned path exceeds a predefined lateral deviation threshold. It is to be understood that the control module 124 can be a main control module that controls all the functions of the autonomous vehicle 100 including the functions of this disclosure, or the control module 124 can be an additional control module that only performs the functions of this disclosure. Additional information related to the functions of control module is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties. In some implementations, the predefined lateral deviation threshold can be one half of a width of a lane relative to a center of the lane. In some other implementations, the lateral deviation is defined to be the difference between a center position of the planned path and a center position of the autonomous vehicle 100. In some other implementations, unplanned event results in the lateral deviation of the autonomous vehicle 100 exceeding the predefined lateral deviation threshold. Unplanned events can include, for example, tire blowout, power loss at an electronic power steering (EPS), torque applied at the steering wheel 140 by a driver to avoid an object at least partially within a lane, etc. Of course, other types of unplanned events exist and the examples above are not meant to be exhaustive.

The memory 110 can be, for example, a random-access memory (RAM), a memory buffer, a hard drive, a read-only memory (ROM), an erasable programmable read-only memory (EPROM), and/or the like. The memory 110 can be configured to store sensor data collected by the sensor(s) 130, data received from the steering wheel 140 through communications network (not shown), and any other data used by the processor 120 to perform the techniques discussed herein. The memory 110 is operatively coupled to the processor 120, and the processor 120 is communicatively coupled to the steering wheel 140 through communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects electronic control units (ECU) within the autonomous vehicle 100 and exchanges information between different ECUs. The ECU having the processor 120 and the memory 110 can receive data representing the steering wheel data from the communication network. In some instances, the memory 110 can store, for example, one or more software programs and/or code that can include instructions to cause the processor 120 to perform one or more processes, functions, and/or the like. In some implementations, the memory 110 can include extendible storage units that can be added and used incrementally. In some implementations, the memory 110 can be a portable memory (for example, a flash drive, a portable hard disk, and/or the like) that can be operatively coupled to the processor 120. In some instances, the memory 110 can be remotely operatively coupled with a compute device (not shown). For example, a remote database device can serve as a memory and be operatively coupled to the processor 120.

The memory 110 can store a software model(s) (not shown). The software model(s) can be, for example, an artificial intelligence (AI) model(s), a machine learning (ML) model(s), an analytical model(s), or a mathematical model(s). The software model(s) can calculate one or more kinds of data such as position, speed, orientation, lateral deviation, and/or other types of data associated with the surroundings of the autonomous vehicle 100 to determine whether a lateral deviation exceeds a predefined lateral deviation threshold. If it is determined that the lateral deviation exceeds the predefined lateral deviation threshold, processor disengages the autonomous mode. A notification can also be sent to notify the driver that the autonomous vehicle is disengaged in the autonomous mode. If it is determined that the lateral deviation does not exceed the predefined lateral deviation threshold, a notification can be sent by the processor 120 to notify the driver that the autonomous mode is not disengaged. Note that the notification(s) to the driver to indicate whether the autonomous mode is disengaged can be audible, visual, vibrating, or any combination of appropriate type of notification methods.

The sensor(s) 130 can include one or more sensors for collecting sensor data. The sensor(s) 130 can be used to observe and gather any information that would be useful for performing the techniques discussed herein, such as information associated with an external environment of the autonomous vehicle 100 and/or the autonomous vehicle 100 itself. The sensor(s) 130 can include, for example, one of a camera 131, a radar 132, a lidar 133, or an inertial navigation system (INS) 134. In some implementations, the sensor(s) 130 can include, at least two type of sensors from the following: a camera 131, a radar 132, a lidar 133, and an inertial navigation system (INS) 134. In some other implementations, the sensor(s) 130 can include, three type of sensors from the following: a camera 131, a radar 132, a lidar 133, and an inertial navigation system (INS) 134. In yet other implementations, at least one of all four sensor types are included. The sensor(s) 130 can collect sensor data that includes representations of attributes associated with the autonomous vehicle 100, such as the autonomous vehicle's 100 speed, location, orientation, acceleration, size, weight, etc. Additionally or alternatively, the sensor(s) 130 can collect sensor data that includes representations of attributes associated with an external environment of the autonomous vehicle 100, such as a speed, location, orientation acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) 130 includes information of a topography surrounding the autonomous vehicle 100 that is relevant, such as a road, sign, traffic light, walkway, building, body of water, etc.

As sensor data associated with the autonomous vehicle 100 and/or the surrounding region of the autonomous vehicle 100 is being captured by the sensor(s) 130 (e.g., images are captured by the camera 131), processor 120 can analyze the sensor data to detect objects/obstacles near the autonomous vehicle 100. For example, processor 114 can use a software model(s) such as a machine learning model(s) (e.g., a computer vision model that uses a library of programming function such as those in OpenCV) to identify any type of object in an image captured by the camera 131 (or lidar 133, or radar 132). Examples of objects to be detected can include one or more of people, animals, cars, trucks, bikes, motorcycles, trees, signs, lane markings, cones, and/or rocks. Additionally, a software model(s) such as a machine learning model(s) can be used to detect features associated with the detected objects. For example, the processor 120 can use a machine learning model (e.g., computer vision model) to identify features associated with the detected objects. Examples of features to be detected can include one or more of a position, speed, orientation, size, and/or type associated with the object. Additional discussion related to object/feature detection are discussed in U.S. Pat. No. 11,042,155, the contents of which are incorporated in its entirety herein.

The autonomous vehicle 100 can be, for example, a medium truck, heavy truck, very heavy truck, greater than 14,000 pounds, greater than 26,000 pounds, greater than 70,000 pounds, or greater than 80,000 pounds. To ensure that larger vehicles have enough time/distance to perform appropriate maneuvers, the objects can be detected well in advance. In one or more implementations, the object can be detected well in advance using long range sensors (e.g., long range radar sensor) included in the sensor(s) 130.

The steering wheel 140 operatively coupled to the processor 120 is disposed within the autonomous vehicle 100 and is configured to receive torques applied by a driver of the autonomous vehicle 100. In some implementations, the steering wheel 140 can also include capacitance sensor(s) (not shown) disposed at the steering wheel 140 to detect changes in capacitance when driver touches the steering wheel 140. In some implementations, the disengaging of the autonomous mode of the autonomous vehicle 100 is independent of a capacitance detected by the capacitance sensor(s) while the autonomous vehicle 100 is moving in the autonomous mode. In other embodiments, the disengaging of the autonomous mode of the autonomous vehicle 100 is independent of a torque applied by a driver of the vehicle on the steering wheel 140 while the autonomous vehicle 100 is moving in the autonomous mode.

Figure 2:
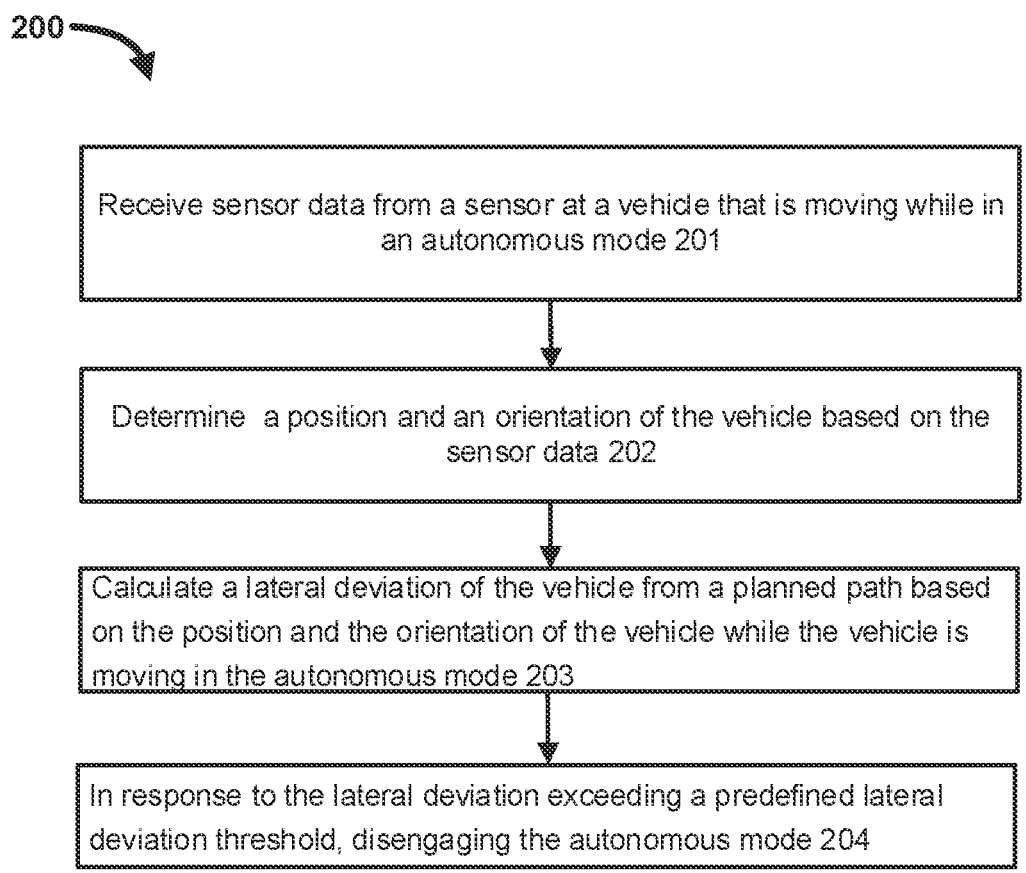
FIG. 2 shows a flowchart of a method for disengaging autonomous mode of an autonomous vehicle, according to an embodiment.

FIG. 2 shows a flowchart of a method for disengaging an autonomous mode based on lateral error in autonomous vehicle, according to an embodiment. In some implementations, the method of FIG. 2 can be performed for example by the processor 120 of the autonomous vehicle 100.

At 201, sensor data is received from a sensor (e.g., sensor(s) 130) at a processor (e.g., processor 120). The processor can include for example one or more modules: a perception module (e.g., perception module 121), a localization module (e.g., localization module 122), a planning module (e.g., planning module 123), and a control module (e.g., control module 124). For example, the perception module of the processor can receive sensor data from sensor(s) and process the sensor data. For example, the perception module can process data by performing sensor fusion for data received from various sensor(s). The perception module can also process the sensor data to detect and track static and/or dynamic objects while the vehicle is moving in the autonomous mode. Examples of objects to be detected and tracked can include one or more of people, animals, cars, trucks, bikes, motorcycles, trees, signs, lane markings, cones, and/or rocks. Additional information related to object/feature detection is provided in U.S. Pat. No. 11,042,155, the content of which is incorporated in its entirety herein. The perception module outputs the processed data to the localization module and the planning module. It is to be understood that the processor can be a processor remote to the autonomous vehicle, or from a processor on the autonomous vehicle (e.g., processor 120 or a different processor on the autonomous vehicle 100 that is capable to perform the function of the disclosure).

At 202, a position and an orientation of the vehicle is determined at the processor (e.g., processor 120) based on the sensor data received at 201. The localization module (e.g., localization module 122) of the processor for example can receive the processed data from the perception module and determine the position and orientation of the autonomous vehicle (e.g., autonomous vehicle 100). Additional information related to position and orientation determination is provided in each of US Patent Publication No. 2019/0185010, US Patent Publication No. 2019/0185011, US Patent Publication No. 2019/0185012, and U.S. Pat. No. 11,130,497, the contents of which are incorporated in their entireties herein. The localization module for example can output the position and the orientation of the autonomous vehicle to the planning module and the control module.

At 203, a lateral deviation of the vehicle from a planned path based on the position and the orientation of the vehicle while the vehicle is moving in the autonomous mode is calculated at the processor (e.g., processor 120). The planning module (e.g., planning module 123) of the processor for example can determine a planned path of the autonomous vehicle based on the data received from the perception module and the localization module. It is to be understood that the planned path can also be provided by a processor remote to vehicle, or from a processor on the vehicle (e.g., part of processor 120 or a different processor on the autonomous vehicle 100). In some implementations, a general route or trajectory can be provided from a remote processor, planning module can determine detailed path such as which lane is the best. Alternatively, planning module can determine both the general route/trajectory and the detailed path such as the specific lanes. In some implementations, the planned path includes a road surface having at least one of a missing lane boundary marking, a non-uniform lane width, or a parking lot etc. Of course, other types of planned path exist and the examples above are not meant to be exhaustive. Additional information related to path planning is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties. The planning module outputs the planned path to the control module.

The control module (e.g., control module 124) of the processor for example can control a motion of the autonomous vehicle. The control module can receive the input planned path from the planning module and the position and orientation information of the autonomous vehicle from the localization module. The control module can control the motion of the autonomous vehicle to follow the planned path from the planning module with minimal deviation. Deviation is calculated based on the difference between the planned path and the actual position and orientation of the vehicle. Lateral deviation from the planned path is calculated based on the position and orientation of the vehicle while the vehicle is moving in the autonomous mode. It is to be understood that the control module can be a main control module that controls all the functions of the vehicle including the function of this disclosure, or the control module can be an additional control module that only performs the function in this disclosure. Additional information related to the functions of control module is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties.

At 204, in response to the lateral deviation exceeding a predefined lateral deviation threshold, the autonomous mode is disengaged. The control module (e.g., control module 124) of the processor for example can calculate the lateral deviation from the planned path based on the position and orientation of the vehicle while the vehicle is moving in the autonomous mode. The control module can disengage the autonomous mode of the autonomous vehicle in response to the lateral deviation of the autonomous vehicle relative to the planned path exceeding a predefined lateral deviation threshold. In some implementations, the predefined lateral deviation threshold can be one half of a width of a lane relative to a center of the lane. In some other implementations, the lateral deviation is defined to be the difference between a center position of the planned path and a center position of the autonomous vehicle.

In some implementations, the disengaging of the autonomous mode of the autonomous vehicle also depends on a torque applied by a driver of the vehicle on the steering wheel (e.g., steering wheel 140) while the autonomous vehicle is moving in the autonomous mode. For example, the driver can apply a torque on the steering wheel with an intent to disengage the autonomous mode. The processor (e.g., processor 120) receives a signal indicating the torque applied by the driver of the vehicle on the steering wheel (e.g., steering wheel 140) while the vehicle is moving in the autonomous mode. If it is determined that the torque is above a torque threshold (e.g., an amount of predefined torque to communicate an intent to disengage the autonomous mode) associated with manual disengagement, the control module of the processor disengages the autonomous mode of the autonomous vehicle (optionally, even if the lateral deviation does not exceed the predefined lateral deviation threshold). If it is determined that both the torque is below the torque threshold and the lateral deviation exceeds the predefined lateral deviation threshold, the control module of the processor disengages the autonomous mode of the autonomous vehicle. In some other embodiments, the disengaging of the autonomous mode of the autonomous vehicle is independent on a torque applied by a driver of the vehicle on the steering wheel (steering wheel 140) while the autonomous vehicle is moving in the autonomous mode. In some implementations, the disengaging of the autonomous mode of the autonomous vehicle is independent of a capacitance detected by capacitance sensor(s) disposed at the steering wheel (not shown) while the autonomous vehicle is moving in the autonomous mode. In some other implementations, an unplanned event(s) results in the lateral deviation of the autonomous vehicle exceeding the predefined lateral deviation threshold. Unplanned events can include, for example, tire blowout, power loss at an electronic power steering (EPS), torque applied at the steering wheel by a driver to avoid an object at least partially within a lane, etc. Of course, other types of unplanned events exist and the examples above are not meant to be exhaustive.

Figure 3:
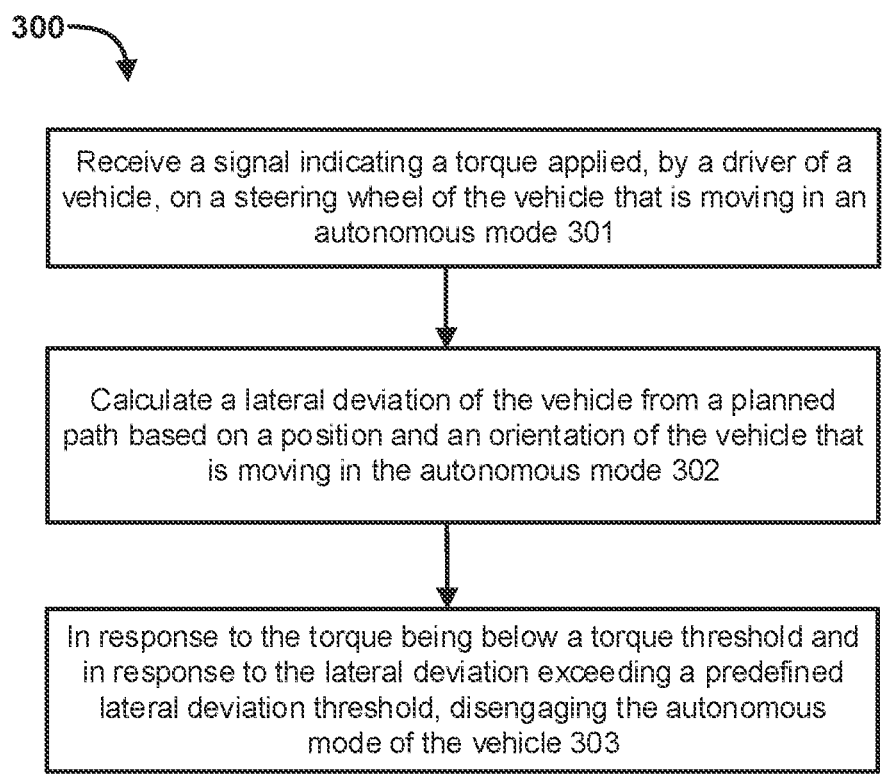
FIG. 3 shows a flowchart for disengaging autonomous mode of an autonomous vehicle, according to another embodiment.

FIG. 3 shows a flowchart of a method for disengaging an autonomous mode based on lateral error in autonomous vehicle, according to an embodiment. In some implementations, the method of FIG. 3 can be performed for example by the processor 120 of the autonomous vehicle 100.

At 301, a signal indicating a torque applied, by a driver of a vehicle, on a steering wheel of the vehicle that is moving in an autonomous mode is received at a processor (e.g., processor 120). The torque is applied by the driver on the steering wheel (e.g., steering wheel 140). The steering wheel is communicatively coupled to the processor through communications network (not shown). The signal indicating the torque applied is transmitted to the processor through the communications network. The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects electronic control units (ECU) within the vehicle and exchange information between different ECUs. The ECU having the processor can receive data representing the steering wheel data from the communication network. In some implementations, the ECU having the processor can be separate and distinct from every other ECU(s) in the autonomous vehicle and operatively coupled to the communication backbone network. In other implementations, the ECU having the processor can be part of an existing ECU(s) that is programmed to have the functions discussed in this disclosure and operatively coupled to the communication backbone network.

At 302, a lateral deviation of the vehicle from a planned path based on a position and an orientation of the vehicle while the vehicle is moving in the autonomous mode is calculated at the processor (e.g., processor 120). The processor can include for example one or more modules: a perception module (e.g., perception module 121), a localization module (e.g., localization module 122), a planning module (e.g., planning module 123), and a control module (e.g., control module 124).

The perception module of the processor can example can receive sensor data from sensor(s) and process the sensor data. The sensor(s) (e.g., sensor(s) 130) can include one or more sensors for collecting sensor data. The sensor(s) can be used to observe and gather any information that would be useful for performing the techniques discussed herein, such as information associated with an external environment of the autonomous vehicle and/or the autonomous vehicle itself. The sensor(s) can include, for example, one of a camera, a radar, a lidar, or an inertial navigation system (INS). In some implementations, the sensor(s) can include, at least two type of sensors from the following: a camera, a radar, a lidar, and an inertial navigation system (INS). In some other implementations, the sensor(s) can include, three type of sensors from the following: a camera, a radar, a lidar, and an inertial navigation system (INS). In other words, the sensor(s) can include at least one sensor from a given sensor type for only one sensor type, two sensor types, etc. The sensor(s) can collect sensor data that includes representations of attributes associated with the autonomous vehicle, such as the autonomous vehicle's speed, location, orientation, acceleration, size, weight, etc. Additionally or alternatively, the sensor(s) can collect sensor data that includes representations of attributes associated with an external environment of the autonomous vehicle, such as a speed, location, orientation acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) includes information of a topography surrounding the autonomous vehicle that is relevant, such as a road, sign, traffic light, walkway, building, body of water, etc.

The perception module for example can receive sensor data and processes the data. For example, the perception module can process the data by performing sensor fusion for data received from various sensor(s). The perception module can also process the sensor data to detect and track static and/or dynamic objects while the vehicle is moving in the autonomous mode. Examples of objects to be detected and tracked can include one or more of people, animals, cars, trucks, bikes, motorcycles, trees, signs, lane markings, cones, and/or rocks. Additional information related to object/feature detection is provided in U.S. Pat. No. 11,042, 155, the contents of which are incorporated in its entirety herein. The perception module can output the processed data to the localization module and the planning module. It is to be understood that the processor can be a processor remote to the autonomous vehicle, or from a processor on the autonomous vehicle (e.g., processor 120 or a different processor on the autonomous vehicle 100 that is capable to perform the function of the disclosure).

The localization module (e.g., localization module 122) of the processor for example can receive the processed data from the perception module and determine the position and orientation of the autonomous vehicle (e.g., autonomous vehicle 100). Additional information related to position and orientation determination is provided in each of US Patent Publication No. 2019/0185010, US Patent Publication No. 2019/0185011, US Patent Publication No. 2019/0185012, and U.S. Pat. No. 11,130,497, the contents of which are incorporated in its entirety herein. The localization module can output the position and the orientation of the autonomous vehicle to the planning module and the control module.

The planning module (e.g., planning module 123) of the processor for example can determine a planned path of the autonomous vehicle based on the data received from the perception module and the localization module. It is to be understood that the planned path can also be provided by a processor remote from the autonomous vehicle, or from a processor on the autonomous vehicle (e.g., part of processor 120 or a different processor on the autonomous vehicle 100). In some implementations, a general route or trajectory can be provided from a remote processor, the planning module can determine detailed path such as which lane is the best. Alternatively, the planning module can determine both the general route/trajectory and the detailed path such as the specific lanes. In some implementations, the planned path includes a road surface having at least one of a missing lane boundary marking, a non-uniform lane width, or a parking lot etc. Of course, other types of planned path exist and the examples above are not meant to be exhaustive. Additional information related to path planning is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties. The planning module outputs the planned path to the control module.

The control module (e.g., control module 124) of the processor for example can receive the input planned path from the planning module and the position and orientation information of the autonomous vehicle from the localization module. The control module for example can control the motion of the autonomous vehicle to follow the planned path from the planning module with minimal deviation. Deviation is calculated based on the difference between the planned path and the actual position and orientation of the vehicle. Lateral deviation from the planned path is calculated based on the position and orientation of the vehicle while the vehicle is moving in the autonomous mode. It is to be understood that the control module can be a main control module that controls all the functions of the vehicle including the function of this disclosure, or the control module can be an additional control module that only performs the function in this disclosure. Additional information related to the functions of control module is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties.

At 303, in response to the torque being below a torque threshold and in response to the lateral deviation exceeding a predefined lateral deviation threshold, the autonomous mode is disengaged. The control module (e.g., control module 124) of the processor for example can calculate the lateral deviation from the planned path based on the position and orientation of the vehicle while the vehicle is moving in the autonomous mode. If it is determined that both the torque is below a torque threshold (e.g., an amount of predefined torque to communicate an intent to disengage the autonomous mode) and the lateral deviation exceeds the predefined lateral deviation threshold, the control module of the processor disengages the autonomous mode of the autonomous vehicle. In some implementations, the predefined lateral deviation threshold can be for example one half of a width of a lane relative to a center of the lane. In some other implementations, the lateral deviation is defined to be the difference between a center position of the planned path and a center position of the autonomous vehicle. In some implementations, the disengaging of the autonomous mode of the autonomous vehicle is independent of a capacitance detected by capacitance sensor(s) disposed at the steering wheel (not shown) while the autonomous vehicle is moving in the autonomous mode. In some other implementations, an unplanned event(s) results in the lateral deviation of the autonomous vehicle exceeding the predefined lateral deviation threshold. Unplanned events can include, for example, tire blowout, power loss at an electronic power steering (EPS), torque applied at the steering wheel by a driver to avoid an object at least partially within a lane, etc. Of course, other types of unplanned events exist and the examples above are not meant to be exhaustive.

Figure 4:
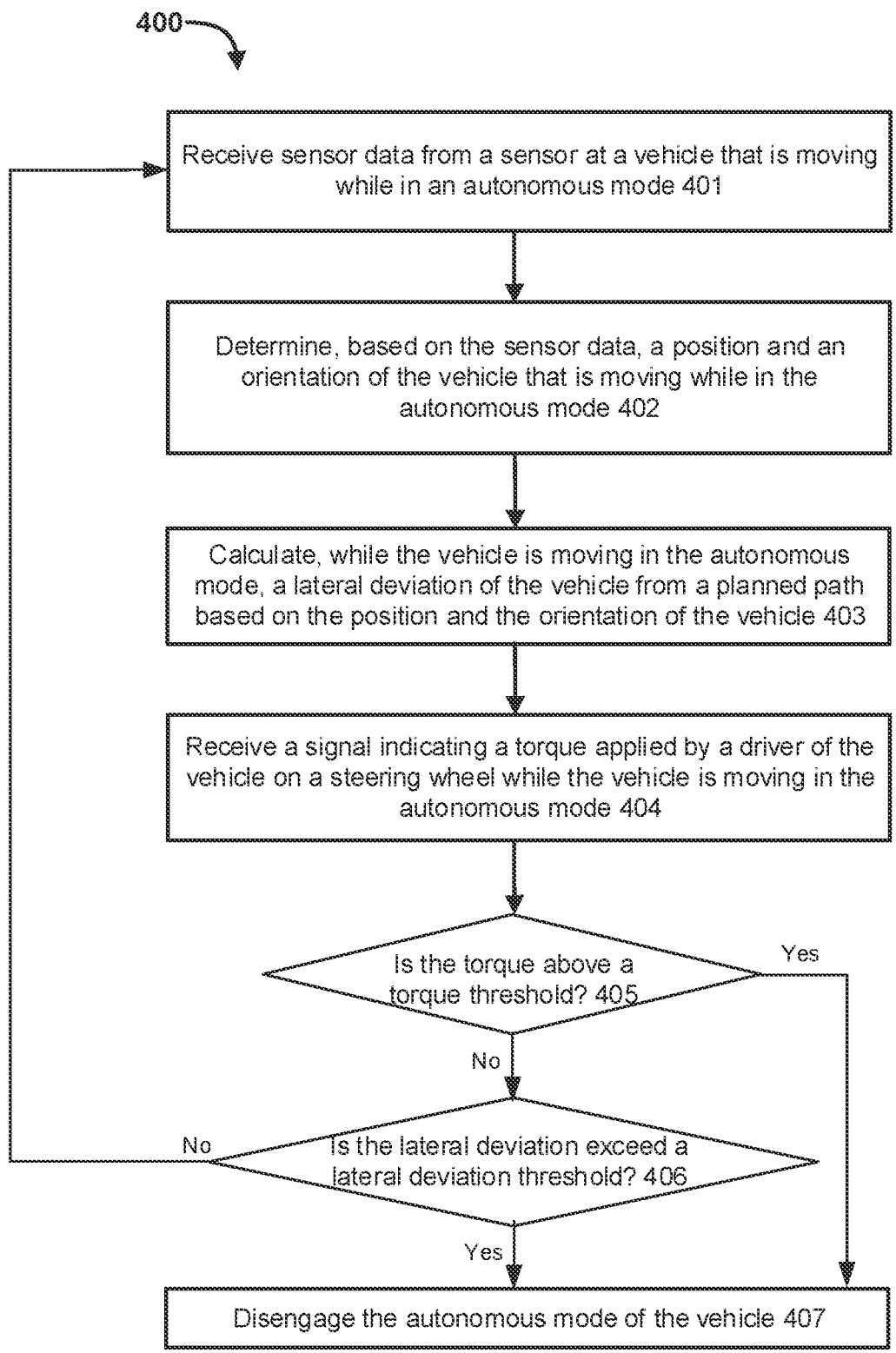
FIG. 4 shows a flowchart for disengaging autonomous mode of an autonomous vehicle, according to yet another embodiment.

FIG. 4 shows a method for disengaging an autonomous mode based on lateral error in autonomous vehicle, according to an embodiment. In some implementations, the method of FIG. 4 can be performed for example by the processor 120 of the autonomous vehicle 100.

At 401, sensor data is received from a sensor (e.g., sensor(s) 130) at a processor (e.g., processor 120). The sensor(s) (e.g., sensor(s) 130) can include one or more sensors for collecting sensor data. The sensor(s) can be used to observe and gather any information that would be useful for performing the techniques discussed herein, such as information associated with an external environment of the autonomous vehicle and/or the autonomous vehicle itself. The sensor(s) can include, for example, one of a camera, a radar, a lidar, or an inertial navigation system (INS). In some implementations, the sensor(s) can include, at least two type of sensors from the following: a camera, a radar, a lidar, and an inertial navigation system (INS). In some other implementations, the sensor(s) can include, three type of sensors from the following: a camera, a radar, a lidar, and an inertial navigation system (INS). In other words, the sensor(s) can include at least one sensor from a given sensor type for only one sensor type, two sensor types, etc. The sensor(s) can collect sensor data that includes representations of attributes associated with the autonomous vehicle, such as the autonomous vehicle's speed, location, orientation, acceleration, size, weight, etc. Additionally or alternatively, the sensor(s) can collect sensor data that includes representations of attributes associated with an external environment of the autonomous vehicle, such as a speed, location, orientation acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) includes information of a topography surrounding the autonomous vehicle that is relevant, such as a road, sign, traffic light, walkway, building, body of water, etc.

The processor can include one or more modules: a perception module (e.g., perception module 121), a localization module (e.g., localization module 122), a planning module (e.g., planning module 123), and a control module (e.g., control module 124). The perception module of the processor for example can receive sensor data from sensor(s) and process the sensor data. For example, the perception module processes data by performing sensor fusion for data received from various sensor(s). The perception module for example can also process the sensor data to detect and track static and/or dynamic objects while the vehicle is moving in the autonomous mode. Examples of objects to be detected and tracked can include one or more of people, animals, cars, trucks, bikes, motorcycles, trees, signs, lane markings, cones, and/or rocks. In some implementations, the perception module can detect a location of an object at least partially within a lane based on the sensor data while the vehicle is moving within the lane in the autonomous mode. Additional information related to object/feature detection is provided in U.S. Pat. No. 11,042,155, the contents of which are incorporated in its entirety herein. The perception module outputs the processed data to the localization module and the planning module. It is to be understood that the processor can be a processor remote to the autonomous vehicle, or from a processor on the autonomous vehicle (e.g., processor 120 or a different processor on the autonomous vehicle 100 that is capable to perform the function of the disclosure).

At 402, a position and an orientation of the vehicle is determined at the processor (e.g., processor 120) based on the sensor data received at 401. The localization module (e.g., localization module 122) of the processor for example can receive the processed data from the perception module and determine the position and orientation of the autonomous vehicle (e.g., autonomous vehicle 100). Additional information related to position and orientation determination is provided in each of US Patent Publication No. 2019/0185010, US Patent Publication No. 2019/0185011, US Patent Publication No. 2019/0185012, and U.S. Pat. No. 11,130,497, the contents of which are incorporated in its entirety herein. The localization module outputs the position and the orientation of the autonomous vehicle to the planning module and the control module.

At 403, a lateral deviation of the vehicle from a planned path based on the position and the orientation of the vehicle while the vehicle is moving in the autonomous mode is calculated at the processor (e.g., processor 120). The planning module (e.g., planning module 123) of the processor for example can determine a planned path of the autonomous vehicle based on the data received from the perception module and the localization module. It is to be understood that the planned path can also be provided by a processor remote to vehicle, or from a processor on the vehicle (e.g., part of processor 120 or a different processor on the autonomous vehicle 100). In some embodiments, a general route or trajectory can be provided from a remote processor, planning module can determine detailed path such as which lane is the best. Alternatively, planning module can determine both the general route/trajectory and the detailed path such as the specific lanes. In some implementations, the planned path includes a road surface having at least one of a missing lane boundary marking, a non-uniform lane width, or a parking lot etc. Of course, other types of planned path exist and the examples above are not meant to be exhaustive. Additional information related to path planning is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties. The planning module outputs the planned path to the control module.

The control module (e.g., control module 124) of the processor for example can control a motion of the autonomous vehicle. The control module for example can receive the input planned path from the planning module and the position and orientation information of the autonomous vehicle from the localization module. The control module for example can control the motion of the autonomous vehicle to follow the planned path from the planning module with minimal deviation and based on the location of the at least one of the static and/or dynamic objects. In some implementations, the control module for example can control a motion of the vehicle in the autonomous mode based on the torque that is applied by the driver of the vehicle on the steering wheel, to avoid the object. In some other implementations, an unplanned event(s) results in the lateral deviation of the autonomous vehicle exceeding the predefined lateral deviation threshold. Unplanned events can include, for example, tire blowout, power loss at an electronic power steering (EPS), torque applied at the steering wheel by a driver to avoid an object at least partially within a lane, etc. Of course, other types of unplanned events exist and the examples above are not meant to be exhaustive.

Deviation is calculated based on the difference between the planned path and the actual position and orientation of the vehicle. Lateral deviation from the planned path is calculated based on the position and orientation of the vehicle while the vehicle is moving in the autonomous mode. It is to be understood that the control module can be a main control module that controls all the functions of the vehicle including the function of this disclosure, or the control module can be an additional control module that only performs the function in this disclosure. Additional information related to the functions of control module is provided in each of US Patent Publication No. 2019/0185010, US Patent Publication No. 2019/0185011, US Patent Publication No. 2019/0185012, and U.S. Pat. No. 11,130,497, all of which are incorporated herein by reference in their entireties.

At 404, a signal indicating a torque applied, by a driver of a vehicle, on a steering wheel of the vehicle that is moving in an autonomous mode is received at a processor (e.g., processor 120). The torque is applied by the driver on the steering wheel (e.g., steering wheel 140). The steering wheel is communicatively coupled to the processor through communications network (not shown). The signal indicating the torque applied is transmitted to the processor through the communications network. The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects electronic control units (ECU) within the vehicle and exchange information between different ECUs. The ECU having the processor can receive data representing the steering wheel data from the communication network. In some implementations, the ECU having the processor can be separate and distinct from every other ECU(s) in the autonomous vehicle and operatively coupled to the communication backbone network. In other implementations, the ECU having the processor can be part of an existing ECU(s) that is programmed to have the functions discussed in this disclosure and operatively coupled to the communication backbone network.

At 405, the processor determines whether the applied torque is above a torque threshold (e.g., an amount of predefined torque to communicate an intent to disengage the autonomous mode). If it is determined that the torque is above the torque threshold associated with manual disengagement, skips to 407 and the control module of the processor disengages the autonomous mode of the autonomous vehicle. If it is determined that the torque is below the torque threshold, proceeds to 406 to determine whether the lateral deviation exceeds a lateral deviation threshold.

At 406, the processor determines whether the lateral deviation exceeds a lateral deviation threshold. The control module (e.g., control module 124) of the processor calculates the lateral deviation from the planned path based on the position and orientation of the vehicle while the vehicle is moving in the autonomous mode. If it is determined that the lateral deviation exceeds the lateral deviation threshold, proceeds to 407 and the control module of the processor for example disengages the autonomous mode of the autonomous vehicle. If it is determined that the lateral deviation does not exceed the lateral deviation threshold, return to 401. In some implementations, the predefined lateral deviation threshold can be one half of a width of a lane relative to a center of the lane. In some other implementations, the lateral deviation is defined to be the difference between a center position of the planned path and a center position of the autonomous vehicle.

At 407, the control module of the processor for example disengages the autonomous mode of the autonomous vehicle in response to the torque being below the torque threshold and in response to the lateral deviation exceeding a predefined lateral deviation threshold. Or the control module of the processor disengages the autonomous mode of the autonomous vehicle in response to the torque being above the torque threshold.

In an embodiments, a method, comprises: receiving, at a processor, sensor data from a sensor at a vehicle that is moving while in an autonomous mode; determining, at the processor, a position and an orientation of the vehicle based on the sensor data; calculating, at the processor, a lateral deviation of the vehicle from a planned path based on the position and the orientation of the vehicle while the vehicle is moving in the autonomous mode; and in response to the lateral deviation exceeding a predefined lateral deviation threshold, disengaging the autonomous mode.

In some implementations, the method further comprises: receiving, at the processor, a signal indicating a torque applied by a driver of the vehicle on a steering wheel while the vehicle is moving in the autonomous mode, the disengaging including disengaging the autonomous mode of the vehicle in response to the torque being below a torque threshold and in response to the lateral deviation exceeding the predefined lateral deviation threshold.

In some implementations, the method further comprises: receiving, at the processor, a signal indicating a torque applied by a driver of the vehicle on a steering wheel while the vehicle is moving in the autonomous mode; and in response to the torque being above a torque threshold associated with manual disengagement, disengaging the autonomous mode of the vehicle, the disengaging including disengaging the autonomous mode of the vehicle in response to the torque being below the torque threshold and in response to the lateral deviation exceeding the predefined lateral deviation threshold.

In some implementations, the disengaging includes disengaging the autonomous mode of the vehicle independent of a torque applied by a driver of the vehicle on a steering wheel while the vehicle is moving in the autonomous mode.

In some implementations, the disengaging includes disengaging the autonomous mode of the vehicle independent of a capacitance detected by a capacitance sensor disposed at a steering wheel of the vehicle, while the vehicle is moving in the autonomous mode.

In some implementations, the predefined lateral deviation threshold is one half of a width of a lane relative to a center of the lane.

In some implementations, the planned path includes a road surface having at least one of a missing lane boundary marking, a non-uniform lane width, or a parking lot; and the predefined lateral deviation threshold is relative to a center position of the planned path and a center position of the autonomous vehicle.

In some implementations, the lateral deviation of the vehicle exceeds the predefined lateral deviation in response to a tire blowout.

In some implementations, the lateral deviation of the vehicle exceeds the predefined lateral deviation in response to a power loss at an electronic power steering (EPS).

In an embodiments, a method, comprises: receiving, at a processor, a signal indicating a torque applied, by a driver of a vehicle, on a steering wheel of the vehicle that is moving in an autonomous mode; calculating, at the processor, a lateral deviation of the vehicle from a planned path based on a position and an orientation of the vehicle that is moving in the autonomous mode; and in response to the torque being below a torque threshold and in response to the lateral deviation exceeding a predefined lateral deviation threshold, disengaging the autonomous mode of the vehicle.

In some implementations, the method further comprises: receiving, at a processor, sensor data from a plurality of sensors at the vehicle while the vehicle is in an autonomous mode, the plurality of sensors including at least two of: a camera, a radar, a lidar, or an inertial navigation system (INS); and determining, at the processor, a position and an orientation of the vehicle based on the sensor data.

In some implementations, the disengaging includes disengaging the autonomous mode of the vehicle independent of a capacitance detected by a capacitance sensor disposed at the steering wheel, while the vehicle is in the autonomous mode.

In some implementations, the lateral deviation of the vehicle exceeds the predefined lateral deviation threshold in response to a tire blowout.

In some implementations, the lateral deviation of the vehicle exceeds the predefined lateral deviation in response to a power loss at an electronic power steering (EPS).

In an embodiment, an apparatus, comprises: a processor; and a memory operatively coupled to the processor, the memory storing instructions that when executed cause the processor to: receive sensor data from a sensor at a vehicle that is moving while in an autonomous mode; determine, based on the sensor data, a position and an orientation of the vehicle that is moving while in the autonomous mode; calculate, while the vehicle is moving in the autonomous mode, a lateral deviation of the vehicle from a planned path based on the position and the orientation of the vehicle; and receive a signal indicating a torque applied by a driver of the vehicle on a steering wheel while the vehicle is moving in the autonomous mode; and in response to the torque being below a torque threshold and in response to the lateral deviation exceeding a predefined lateral deviation threshold, disengage the autonomous mode of the vehicle.

In some implementations, the processor includes a perception module, a localization module, a planning module and a control module, the perception module configured to receive the sensor data and determine the position and the orientation of the vehicle, the localization module configured to output the position and the orientation of the vehicle to the control module, the planning module configured to calculate the lateral deviation and output the lateral deviation to the control module, the control module is configured to control a motion of the vehicle in the autonomous mode based on the planned path, the control module further configured to disengage the autonomous mode of the vehicle.

In some implementations, the memory further stores instructions that when executed cause the processor to: detect a location of at least one of a static object or a dynamic object based on the sensor data while the vehicle is moving in the autonomous mode, and control a motion of the vehicle in the autonomous mode based on the planned path and the location of the at least one of the static object or the dynamic object.

In some implementations, the sensor is included within a plurality of sensors that includes at least two of: a camera, a radar, a lidar, or an inertial navigation system (INS).

In some implementations, the memory further stores instructions that when executed cause the processor to: detect a location of an object at least partially within a lane based on the sensor data while the vehicle is moving within the lane in the autonomous mode, and control a motion of the vehicle in the autonomous mode based on the torque that is applied by the driver of the vehicle on the steering wheel, to avoid the object, the autonomous mode of the vehicle being disengaged in response to the lateral deviation of the vehicle exceeding one half of a width of the lane relative to a center of the lane and not being disengaged when the lateral deviation of the vehicle does not exceed one half of the width of the lane.

In some implementations, the lateral deviation of the vehicle exceeds the predefined lateral deviation in response to an unplanned event.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method comprising:
   determining, by a computing system, an applied torque to a steering wheel of a vehicle;
   calculating, by the computing system, a lateral deviation of a center position of the vehicle from a center of a lane of a planned path based on a position and an orientation of the vehicle, wherein the center position of the vehicle is determined by a localization process based on at least one of: radar, lidar, or an inertial navigation system, and wherein the center of the lane is determined by a perception process based on detected lane markings; and
   engaging, by the computing system, manual control over a driver assistant system based on a determination the applied torque fails to satisfy a torque threshold for engagement of manual control over the driver assistant system and a determination the lateral deviation of the vehicle satisfies a lateral deviation threshold for engagement of manual control over the driver assistant system.

2. The computer-implemented method of claim 1, further comprising:
   determining, by the computing system, manual control over the driver assistant system is not engaged;
   providing, by the computing system, a first notification that manual control over the driver assistant system has not been engaged; and
   providing, by the computing system, a second notification that manual control over the driver assistant system has been engaged based on the engaging.

3. The computer-implemented method of claim 1, further comprising:
   determining, by the computing system, a detailed path based on a general route for navigation of the vehicle, wherein the detailed path includes a lane specific path; and
   determining, by the computing system, the planned path based on the detailed path.

4. The computer-implemented method of claim 1, further comprising:
   detecting, by the computing system, a location of an object based on sensor data, wherein motion of the vehicle is controlled based on the location of the object and the planned path.

5. The computer-implemented method of claim 1, wherein the position of the vehicle corresponds with a center position of the vehicle, and wherein the lateral deviation threshold is based on a center position of the planned path.

6. The computer-implemented method of claim 1, wherein the lateral deviation threshold is based on a percentage of a predetermined value associated with a safe range of deviation from the planned path.

7. The computer-implemented method of claim 1, wherein:
   the planned path includes a path on at least one of: a road surface with a missing lane boundary marking, a road surface with a non-uniform lane width, or a parking lot.

8. The computer-implemented method of claim 1, wherein the planned path is based on a general route received from a remote system.

9. The computer-implemented method of claim 1, wherein the lateral deviation threshold is determined based on a predefined lateral deviation associated with at least one of: a tire blowout, power loss of an electronic power steering (EPS), torque applied to avoid an object, or an unplanned event.

10. A non-transitory, computer-readable storage medium including instructions that, when executed by at least one processor of a computing system, cause the computing system to perform operations comprising:
determining an applied torque to a steering wheel of a vehicle;
calculating a lateral deviation of a center position of the vehicle from a center of a lane of a planned path based on a position and an orientation of the vehicle, wherein the center position of the vehicle is determined by a localization process based on at least one of: radar, lidar, or an inertial navigation system, and wherein the center of the lane is determined by a perception process based on detected lane markings; and
engaging manual control over a driver assistant system based on a determination the applied torque fails to satisfy a torque threshold for engagement of manual control over the driver assistant system and a determination the lateral deviation of the vehicle satisfies a lateral deviation threshold for engagement of manual control over the driver assistant system.

11. The non-transitory, computer-readable storage medium of claim 10, the operations further comprising:
determining the manual control over the driver assistant system is not engaged;
providing a first notification that manual control over the driver assistant system has not been engaged; and
providing a second notification based on a determination that the manual control over the driver assistant system has been engaged.

12. The non-transitory, computer-readable storage medium of claim 10, the operations further comprising:
determining a detailed path based on a general route for navigation of the vehicle, wherein the detailed path includes a lane specific path; and
determining, by the computing system, the planned path based on the detailed path.

13. The non-transitory, computer-readable storage medium of claim 10, the operations further comprising:
detecting a location of an object based on sensor data, wherein motion of the vehicle is controlled based on the location of the object and the planned path.

14. The non-transitory, computer-readable storage medium of claim 10, wherein the position of the vehicle corresponds with a center position of the vehicle, and wherein the lateral deviation threshold is based on a center position of the planned path.

15. A system comprising:
a processor; and
a memory operatively coupled to the processor, the memory storing instructions that when executed cause the processor to perform operations comprising:
determining an applied torque to a steering wheel of a vehicle;
calculating a lateral deviation of a center position of the vehicle from a center of a lane of a planned path based on a position and an orientation of the vehicle, wherein the center position of the vehicle is determined by a localization process based on at least one of: radar, lidar, or an inertial navigation system, and wherein the center of the lane is determined by a perception process based on detected lane markings; and
engaging manual control over a driver assistant system based on a determination the applied torque fails to satisfy a torque threshold for engagement of manual control over the driver assistant system and a determination the lateral deviation of the vehicle satisfies a lateral deviation threshold for engagement of manual control over the driver assistant system.

16. The system of claim 15, the operations further comprising:
determining the manual control over the driver assistant system is not engaged;
providing a first notification that manual control over the driver assistant system has not been engaged; and
providing a second notification based on a determination that the manual control over the driver assistant system has been engaged.

17. The system of claim 15, the operations further comprising:
determining a detailed path based on a general route for navigation of the vehicle, wherein the detailed path includes a lane specific path; and
determining, by the computing system, the planned path based on the detailed path.

18. The system of claim 15, the operations further comprising:
detecting a location of an object based on sensor data, wherein motion of the vehicle is controlled based on the location of the object and the planned path.

19. The system of claim 15, wherein position of the vehicle corresponds with a center position of the vehicle, and wherein the lateral deviation threshold is based on a center position of the planned path.

20. The system of claim 15, wherein the lateral deviation threshold is based on a percentage of a predetermined value associated with a safe range of deviation from the planned path.

* * * * *